(12) United States Patent
Suska

(10) Patent No.: US 8,537,242 B2
(45) Date of Patent: *Sep. 17, 2013

(54) HOST INTERFACE FOR IMAGING ARRAYS

(75) Inventor: Mark Suska, Ottawa (CA)

(73) Assignee: Harusaki Technologies, LLC, Wilmington, DE (US)

( * ) Notice: Subject to any disclaimer, the term of this patent is extended or adjusted under 35 U.S.C. 154(b) by 1584 days.

This patent is subject to a terminal disclaimer.

(21) Appl. No.: 11/259,791

(22) Filed: Oct. 27, 2005

(65) Prior Publication Data

US 2006/0044435 A1    Mar. 2, 2006

Related U.S. Application Data

(62) Division of application No. 09/742,723, filed on Dec. 21, 2000, now Pat. No. 6,972,790.

(60) Provisional application No. 60/177,496, filed on Jan. 21, 2000.

(51) Int. Cl.
   *H04N 5/76*    (2006.01)
   *H04N 5/228*   (2006.01)
   *H04N 5/235*   (2006.01)

(52) U.S. Cl.
   USPC ............... 348/231.1; 348/222.1; 348/230.1

(58) Field of Classification Search
   USPC ............. 348/241, 294, 302, 307, 308, 311, 348/207.1, 333.05, 222.1, 231.3, 231.99, 348/312, 317, 203, 246
   See application file for complete search history.

(56) References Cited

U.S. PATENT DOCUMENTS

| | | | |
|---|---|---|---|
| 4,837,628 A | | 6/1989 | Sasaki |
| 5,581,280 A | * | 12/1996 | Reinert et al. ............ 345/558 |

(Continued)

FOREIGN PATENT DOCUMENTS

| | | |
|---|---|---|
| EP | 0 932 302 A2 | 7/1999 |
| JP | 63-294182 | 11/1988 |

(Continued)

OTHER PUBLICATIONS

Omnivision: "OV511 Advanced Camera to USB Bridge, Data Sheet Rev. 1.0", Jul. 17, 1998, Omnivision Technologies, XP002293773, p. 6-14, tables 9-11, figures 1-4, 6,10,12.

(Continued)

*Primary Examiner* — Trung Diep
(74) *Attorney, Agent, or Firm* — McAndrews, Held & Malloy, Ltd.

(57) ABSTRACT

An interface for receiving data from an image sensor having an imaging array and a clock generator and for transferring the data to a processor system is described. The interface comprises a memory for storing the imaging array data and the clocking signals at a rate determined by the clocking signals. In response to the quantity of data in the memory, a signal generator generates a signal for transmission to the processor system and a circuit controls the transfer of the data from the memory at a rate determined by the processor system. The memory may be a first-in first-out (FIFO) buffer or an addressable memory. The interface is preferably integrated on the same die as the image sensor. The signal generator may generate either an interrupt signal for transmission to the processor system or a bus request signal for transmission to a bus arbitration unit for the processor system.

23 Claims, 8 Drawing Sheets

(56) References Cited

U.S. PATENT DOCUMENTS

| | | | | |
|---|---|---|---|---|
| 5,587,953 | A | * | 12/1996 | Chung ............................ 365/220 |
| 5,752,266 | A | | 5/1998 | Miyawaki et al. |
| 5,786,851 | A | | 7/1998 | Kondo et al. |
| 5,801,773 | A | | 9/1998 | Ikeda |
| 5,920,343 | A | | 7/1999 | Watanabe et al. |
| 6,021,449 | A | * | 2/2000 | Chow et al. ..................... 710/57 |
| 6,064,355 | A | | 5/2000 | Donahue et al. |
| 6,144,366 | A | | 11/2000 | Numazaki et al. |
| 6,297,843 | B1 | | 10/2001 | Glew |
| 6,298,370 | B1 | * | 10/2001 | Tang et al. .................... 718/102 |
| 6,314,140 | B1 | * | 11/2001 | Shelby ..................... 375/240.26 |
| 6,344,877 | B1 | * | 2/2002 | Gowda et al. ................. 348/245 |
| 6,460,095 | B1 | * | 10/2002 | Ueno et al. ..................... 710/52 |
| 6,493,025 | B1 | | 12/2002 | Kiriyama et al. |
| 6,573,936 | B2 | * | 6/2003 | Morris et al. ................. 348/294 |
| 6,593,967 | B1 | * | 7/2003 | McGarvey et al. ........... 348/312 |
| 6,704,310 | B1 | | 3/2004 | Zimmermann et al. |
| 6,721,008 | B2 | | 4/2004 | Lee et al. |
| 6,756,986 | B1 | * | 6/2004 | Kuo et al. ..................... 345/531 |
| 6,757,019 | B1 | * | 6/2004 | Hsieh et al. ................... 348/302 |
| 6,833,862 | B1 | * | 12/2004 | Li ............................. 348/207.99 |
| 6,903,772 | B1 | | 6/2005 | Shinohara |
| 6,947,085 | B1 | * | 9/2005 | Booth, Jr. ...................... 348/302 |
| 6,972,790 | B2 | * | 12/2005 | Suska ......................... 348/222.1 |
| 2002/0101528 | A1 | | 8/2002 | Lee et al. |
| 2002/0191090 | A1 | | 12/2002 | Safai |
| 2004/0004664 | A1 | | 1/2004 | Safai |

FOREIGN PATENT DOCUMENTS

| | | | |
|---|---|---|---|
| JP | 02-065380 | | 3/1990 |
| JP | 05-250307 | | 9/1993 |
| JP | 05-326917 | | 12/1993 |
| JP | 07-114510 | | 2/1995 |
| JP | 2008/314793 | | 11/1996 |
| JP | 2009/102907 | | 4/1997 |
| JP | 09298714 | A * | 11/1997 |
| JP | 10-050966 | | 2/1998 |
| JP | 2010/222646 | | 8/1998 |
| JP | 11-055571 | | 2/1999 |
| JP | 11-195777 | | 7/1999 |
| JP | 11-261894 | | 9/1999 |

OTHER PUBLICATIONS

Omnivision: "OV7610 Single-Chip CMOS VGA Color Digital Camera, Datasheet V1.3", May 15, 1999, Omnivision, XP002293774, p. 3-11, figure 1.

Texas Instruments: "TMS320C54x DSP Reference Set; vol. 1: CPU and Peripherals", Apr. 1999, Texas Instruments, XP002293775, pp. 2-12, pp. 2-14-2-15, pp. 8-37-8-54, pp. 9-33-9-55.

Fossum E. R.: "Digital Camera System on a Chip", IEEE Micro, IEEE Inc. New York, US, vol. 18, No. 3, May 1, 1998, pp. 8-15, XP000755752 ISSN: 0272-1732, p. 12.

Japanese Office Action dated Jun. 25, 2010 (translation provided).

* cited by examiner

HOST INTERFACE FOR IMAGING ARRAYS

This application is a divisional of U.S. application Ser. No. 09/742,723, filed Dec. 21, 2000, now U.S. Pat. No. 6,972,790, which claims the benefit of U.S. Provisional Application No. 60/177,496, filed Jan. 21, 2000.

FIELD OF THE INVENTION

The invention relates generally to integrated electronic image sensing circuitry and more particularly to CMOS imaging circuitry.

BACKGROUND OF THE INVENTION

Integrated circuit (IC) technology, applied to imaging, is revolutionizing that field. Semiconductors can be used to represent an image as an electrical signal. Charge coupled devices (CCDs) are the most significant commercial IC technology to date. However, when compared with CMOS technology, there are many advantages to producing CMOS image devices.

CMOS is a less expensive technology; CMOS employs fewer mask layers and is a more mature fabrication technology with greater commercial volume. CCD technology complexity causes lower fabrication yield. One of the main benefits of employing CMOS technology, compared to CCD, is the ability to include image-processing elements on the same substrate as the imaging circuitry.

On a monolithic semiconductor IC, with a surface coincident to an optical focal plane, photosensitive elements are employed in pixels that are arranged in an array of rows and columns. The basis for the pixels of CMOS technology is a photosensitive diode. In an active pixel arrangement each pixel photodiode is buffered from the shared readout components by an amplification stage.

IC image sensors of existing technologies provide video style output. In one example, such a sensor receives master clock input. The sensor derives data sample, line, and clocks from this master clock. These clocks, which correspond to pixel, row, and column, control the sampling rate of the imaging array. The pixel data of such a sensor is output at the same rate as it is sampled. The derived clocks are output as well to synchronize the data output. The result is a stream of synchronized pixel intensities comprising a video frame.

This output is incompatible with the data interface of commercial microprocessors, without the use of additional glue logic. A commercial microprocessor data interface consists of address and control output signals and data input/output signals. This configuration allows the processor to randomly access any word of data in memory by asserting various addresses.

In an image acquiring computer system based on such a sensor and such a processor, additional interface circuitry to respond to the sensor clock outputs to sample the video information, and to make this video data available in the memory space of the processor. Optionally, this interface circuit may include interrupt signals to the processor, and enough memory space for a number of pixels.

Such additional circuitry diminishes the benefit of a single substrate that integrates sensor and processing elements. The CMOS technology optimum cost benefit is not reached.

Therefore, there is a need for an interface which may be integrated with the imaging array which a system processor can access to directly receive imaging data.

SUMMARY OF THE INVENTION

This invention is directed to an interface for receiving data from an image sensor having an imaging array and a clock generator, and for transferring the data to a processor system. The interface comprises a memory for storing the imaging array data and the clocking signals at a rate determined by the clocking signals. In response to the quantity of data in the memory, a signal generator generates a signal for transmission to the processor system and a circuit controls the transfer of the data from the memory at a rate determined by the processor system. The memory may be a first-in first-out (FIFO) buffer or an addressable memory.

The signal generator may generate an interrupt signal for transmission to the processor system or a bus request signal for transmission to a bus arbitration unit for the processor system. The circuit for controlling the transfer of the data may include a command decoder for receiving address and command signals from the processor system, a configuration register for storing configuration data for the FIFO buffer and a read control for controlling the read-out of the FIFO buffer, and may further include a bus command unit for receiving control of the system bus and providing an address for the data read-out from the memory.

In accordance with another aspect of this invention, an integrated semiconductor imaging circuit for use with an electronic processing system having a data bus comprises an imaging array sensor having an array of sensing pixels and an array address generator integrated on a die and an interface integrated on the same die. The interface is adapted to receive data from the imaging array sensor as determined by the imaging array and to transfer the data to the electronic processing system as determined by the electronic processing system. The interface may include a memory such as a FIFO buffer or an addressable memory for storing imaging array data and address signals at a rate determined by the imaging array sensor, and a circuit for controlling the transfer of the data from the memory means to the data bus at a rate determined by the electronic processing system. The imaging circuit may further include a bus arbitration circuit integrated on the same die and coupled to the circuit for controlling the transfer of the data.

In accordance with a further aspect of this invention, an integrated semiconductor imaging circuit for use with an electronic processing system having a data bus may comprise an imaging array of sensing pixels, a buffer for storing data received at an input port and for outputting data through an output port to the data bus, a circuit for transferring data from a selected pixel to the buffer input port, a circuit for determining the quantity of data in the buffer, a circuit for alerting the electronic processing system when the quantity of data in the buffer attains a predetermined level and a controller adapted to respond to the electronic processing system for controlling the transfer of the stored data through the buffer output port.

In accordance with another aspect of this invention, an integrated semiconductor imaging circuit for use with an electronic processing system having a data bus and a system address/control bus, may comprise an imaging array of sensing pixels, a buffer for storing data received at an input port and for outputting data through an output port to the data bus, a circuit for transferring data from a selected pixel to the buffer input port, a circuit for determining the quantity of data in the buffer, a controller for seeking control of the data bus when the quantity of data in the buffer attains a predetermined level and adapted to respond to the availability of the data bus for controlling the transfer of the stored data through the buffer output port. The integrated semiconductor imaging circuit may further include a bus arbitration unit for receiving data bus control requests and for providing data bus control in response to a request, and the controller for receiving bus control comprising a register for storing and incrementing destination addresses, and a circuit for asserting the destination address and write controls on the system address/control bus.

In accordance with a further aspect of this invention, an integrated semiconductor imaging circuit for use with an electronic processing system having a data bus, may comprise an imaging array of sensing pixels, an addressable memory having a plurality of memory cells arranged in rows and columns for storing data received at an input port and for outputting data through an output port to the data bus, a circuit for transferring data from a selected pixel to a selected memory cell through the memory input port, a circuit for determining the quantity of data in the memory, a circuit for alerting the electronic processing system when the quantity of data in the memory attains a predetermined level, and a controller adapted to respond to the electronic processing system for controlling the transfer of the stored data through the memory output port.

In accordance with another aspect of this invention, an integrated semiconductor imaging circuit for use with an electronic processing system having a data bus and a system address/control bus, may comprise an imaging array of sensing pixels, an addressable memory having a plurality of memory cells arranged in rows and columns for storing data received at an input port and for outputting data through an output port to the data bus, a circuit for transferring data from a selected pixel to a selected memory cell through the memory input port, a circuit for determining the quantity of data in the memory, and a controller for seeking control of the data bus when the quantity of data in the memory attains a predetermined level and adapted to respond to the availability of the data bus for controlling the transfer of the stored data through the memory output port. The integrated semiconductor imaging circuit may further include a bus arbitration unit for receiving data bus control requests and for providing data bus control in response to a request, and the controller for receiving bus control comprising a register for storing and incrementing destination addresses, and a circuit for asserting the destination address and write controls on the system address/control bus.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
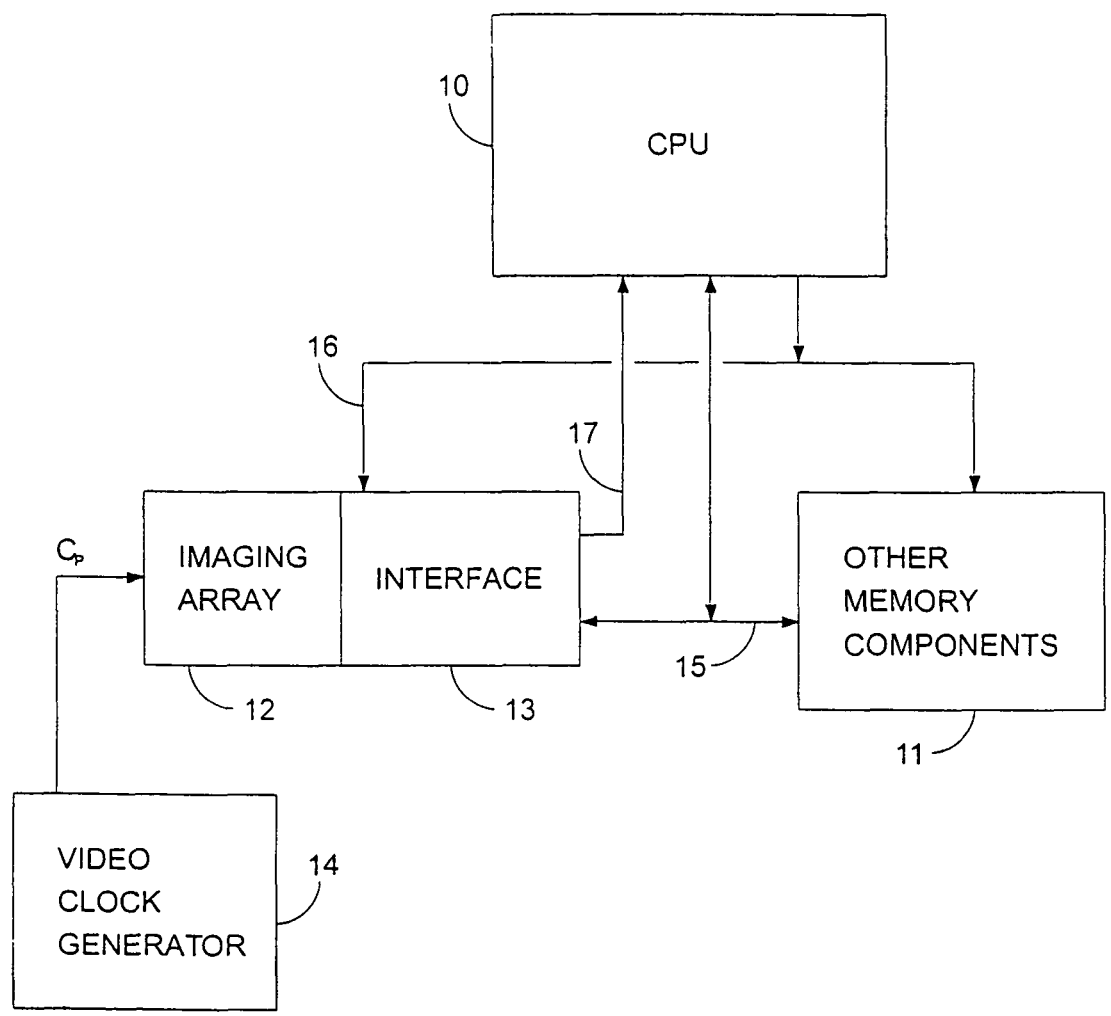
FIG. 1 is a block diagram of a computer system utilizing the imaging array sensor.

The imaging computer system illustrated in FIG. 1 includes a central processing unit (CPU) 10, other memory and system components 11, an imaging array sensor 12, an interface 13 in accordance with the present invention and a video clock generator 14. The CPU 10, components 11 and interface 13 all have access to a system data bus 15 and are controlled by the CPU 11 via the system control and address bus 16. The clock generator 14 provides pixel clock signals $C_P$ to the imaging array sensor 12. The interface 13 is further connected to the CPU 10 through an interrupt bus 17 by which the CPU 10 is signalled that data is available for it to upload.

In accordance with the present invention, the interface 13 stores data and clocking signals from the imaging array sensor 12 in order to free up the CPU 10 for other processing. In addition, the full economic and commercial advantage of CMOS technology may be gained by integrating the interface 13 on the same die as the imaging array sensor 12.

Figure 2:
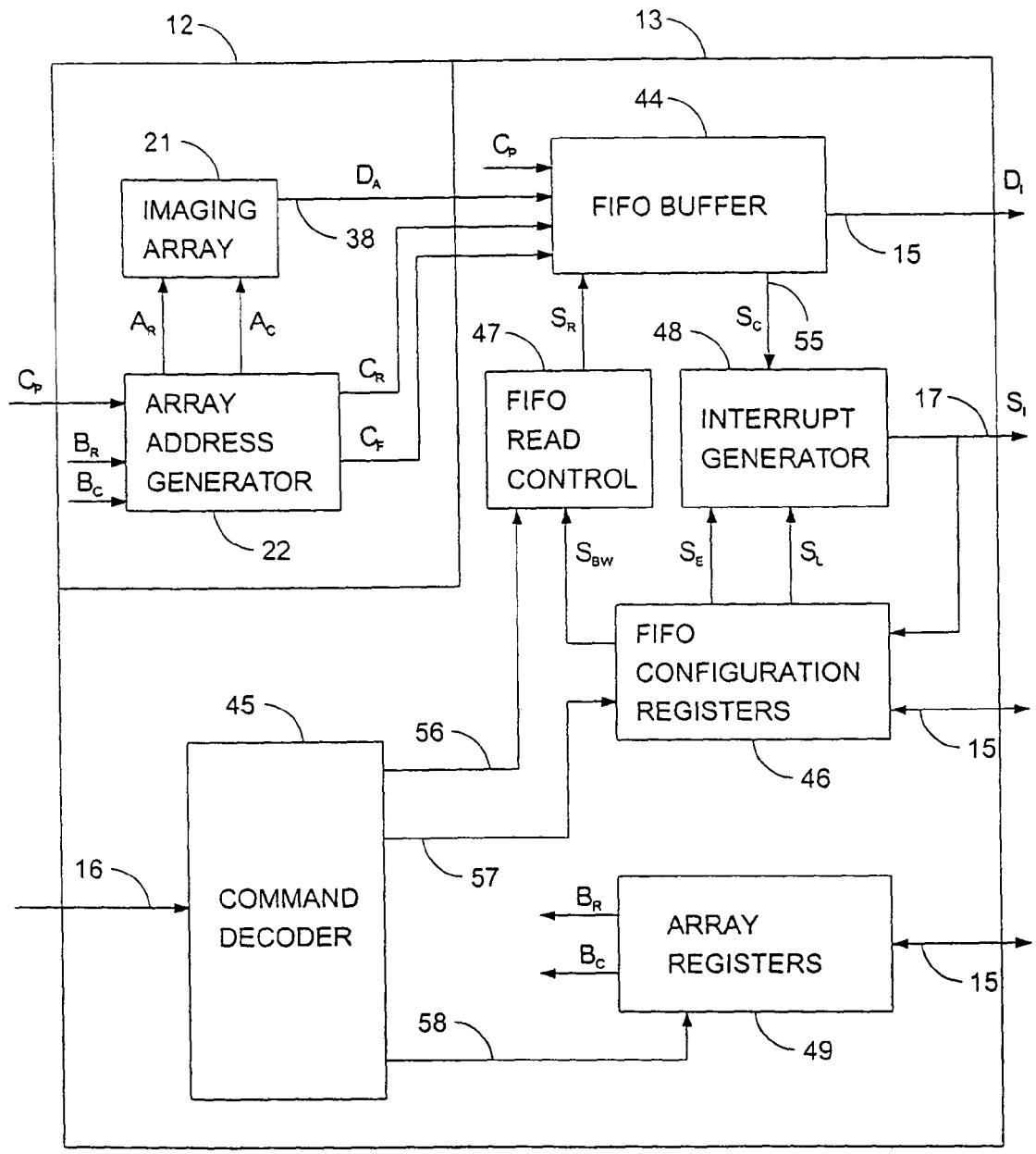
FIG. 2 is a block diagram of an imaging array sensor including the interface of the present invention.

An embodiment of the interface 13 is illustrated as a block diagram in FIG. 2. The imaging array sensor 12 includes an imaging array 21 which is an array of active photosensitive pixels with access control as will be described further with reference to FIG. 3. The imaging array 21 further includes an array address generator 22 which generates the column addresses $A_C$, the row addresses $A_R$, the row clock $C_R$ and the frame clock $C_F$ as will be described further with reference to FIG. 4.

Figure 3:
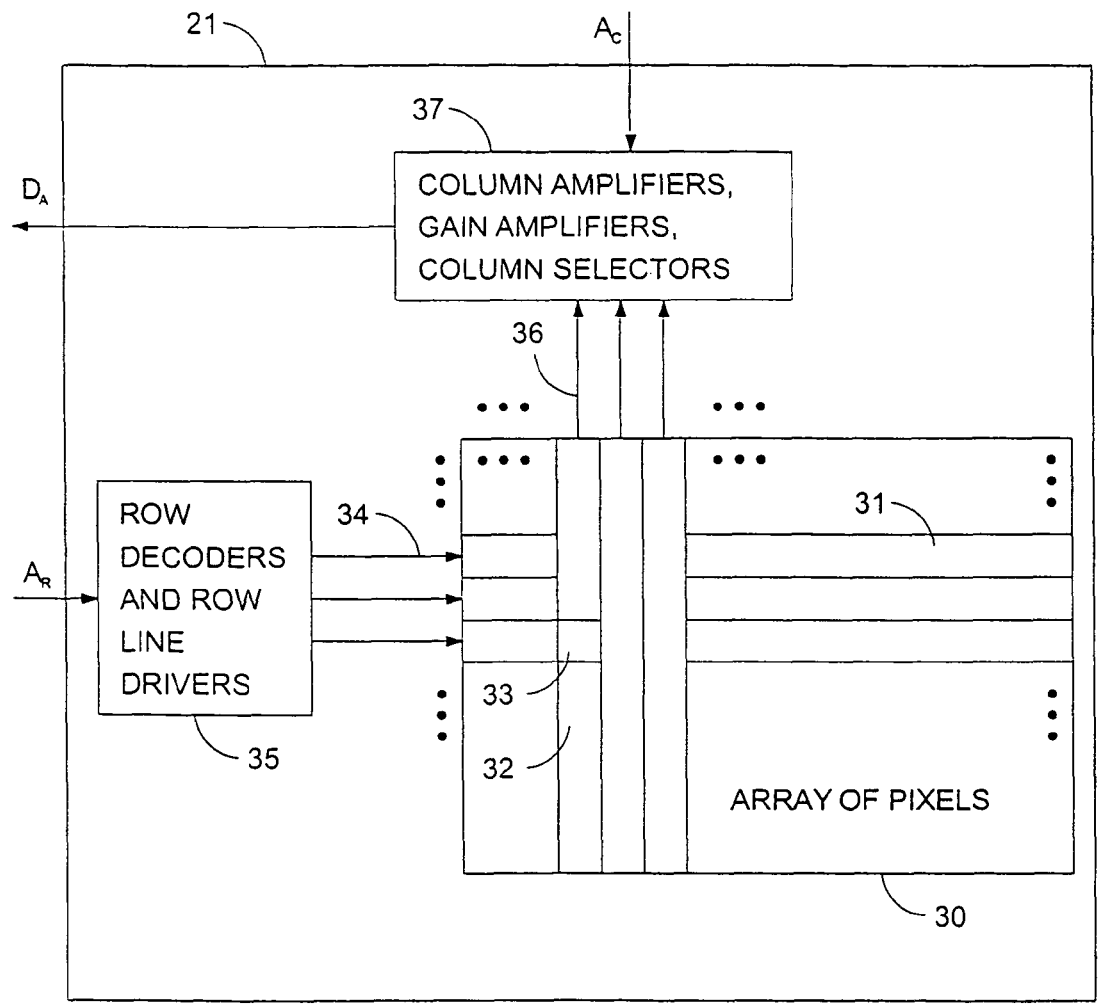
FIG. 3 is a block diagram of the pixel imaging array and access.

Referring to FIG. 3, the array 30 of pixels 33 is organized in rows 31 and columns 32. Each pixel 33 is located at the intersection of a row 31 and a column 32. The row control lines 34 provide access to a row 31 of pixels 33. The row line 34 is driven by the row drivers 35 in response to the row address signal $A_R$. Each selected pixel 33 asserts data onto its own column data line 36 when accessed. The data on lines 36 is amplified by column amplifiers and second stage amplification in unit 37. Unit 37 further selects the column 32 as determined by column address $A_C$ from which array data $D_A$ is placed on the array output 38.

Figure 4:
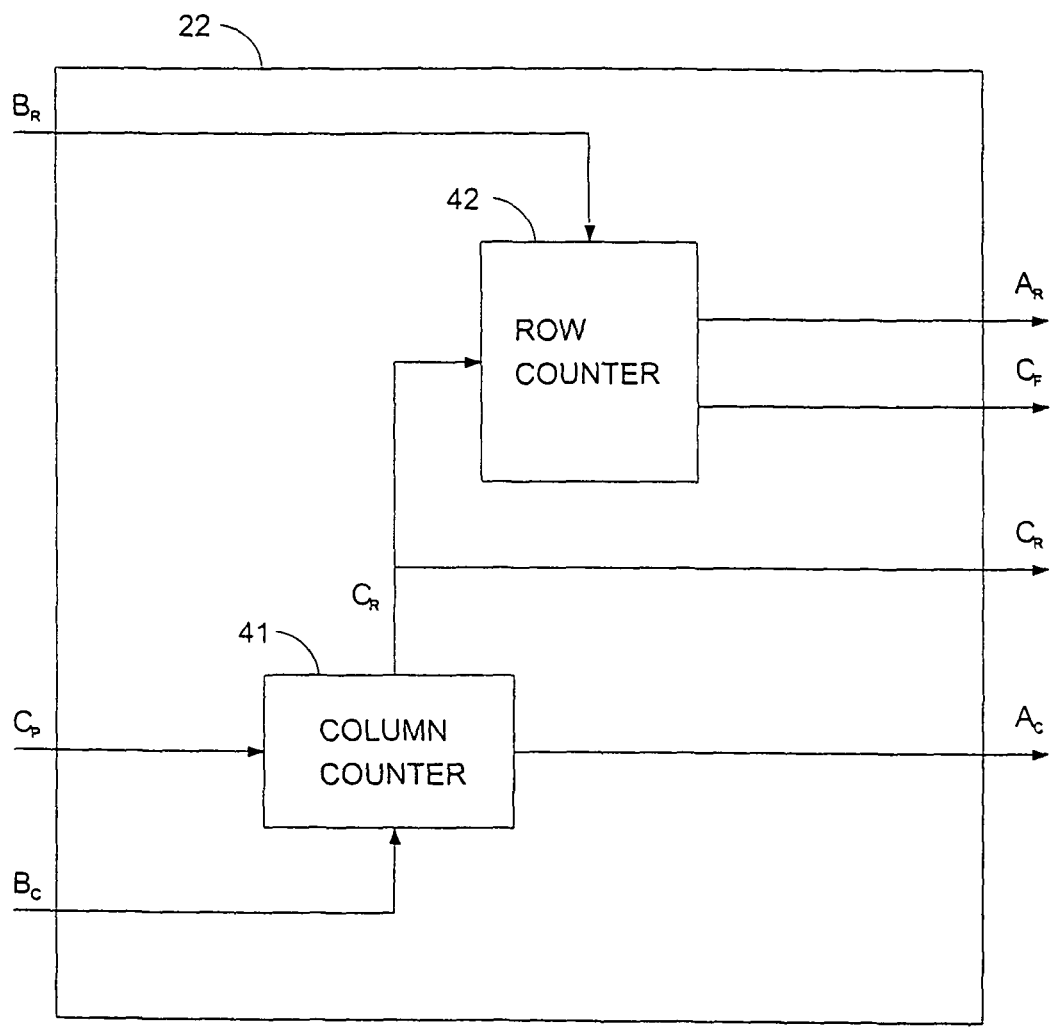
FIG. 4 is a block diagram of the video clock and array address generator.

Referring to FIG. 4, the array address generator 22 is shown in greater detail. The column address $A_C$ is generated by a column counter 41 which is incremented by the video system clock $C_P$. The maximum number of sequential addresses generated by the column counter 41 will depend on the number of columns in the imaging array 21, however the actual number of sequential addresses generated by the column counter 41 will be determined by the column boundary signal $B_C$ which is controlled by the CPU 10 as will be described later. The row clock $C_R$ is generated by the overflow of the column counter 41. The row counter 42 generates the row address signal $A_R$ based on the row clock signal $C_R$ and the row boundary signal $B_R$. The maximum number of sequential addresses generated by the row counter 42 will depend on the number of rows in the imaging array 21, however the actual number of sequential addresses generated by the row counter 42 will be determined by the row boundary signal $B_R$ which is controlled by the CPU 10 as will be described later. The row clock $C_R$ is also applied to an output 43 from the array address generator 22. The row counter 42 also generates a frame signal $C_F$ based on count overflow.

Figure 5:
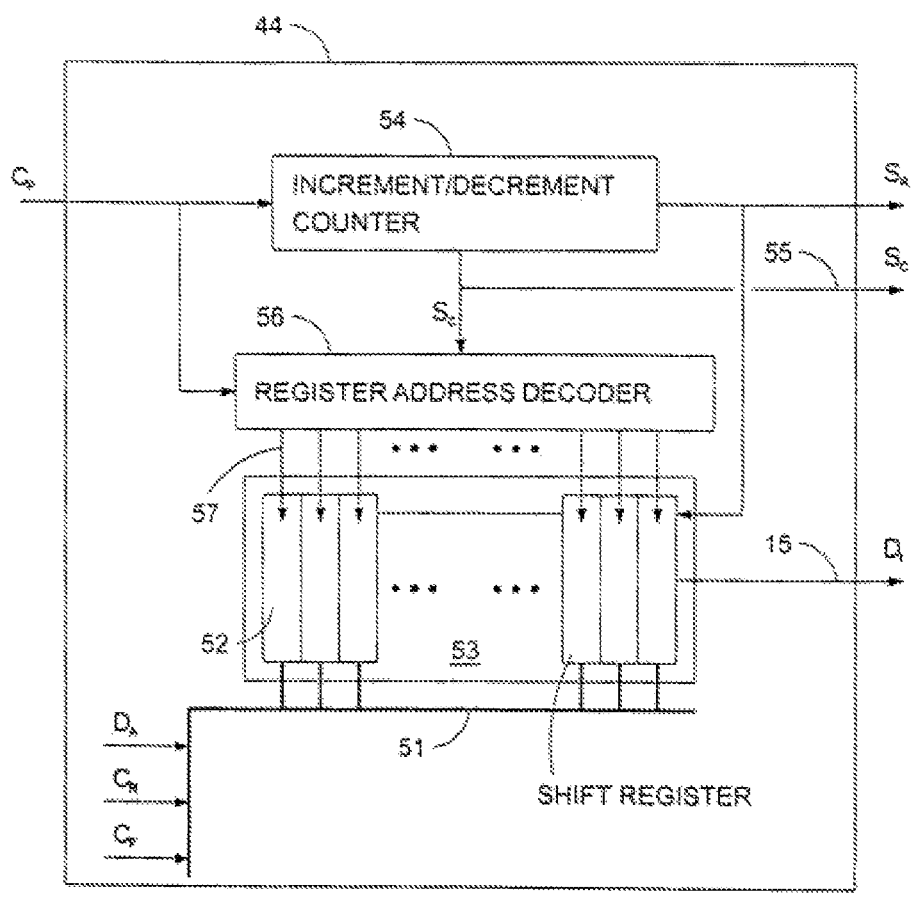
FIG. 5 is a block diagram of a FIFO buffer.

Referring again to FIG. 2, the interface 13 includes a memory 44 as well as devices 45 to 49 required to support the memory 44. In this particular embodiment, memory 44 is a first-in first-out (FIFO) buffer memory. FIFO buffer 44 receives array data $D_A$ from the imaging array, clocking signals $C_P$ from the video clock generator 14 and clocking signals $C_R$ and $C_F$ from the array address generator 22. FIFO buffer 44 is shown in greater detail in FIG. 5. The imaging array 21 output $D_A$, row clock $C_R$ and frame clock $C_F$ are bundled onto a single bus 51 for storage in the buffer 44. The storage components of the FIFO buffer 44 are registers 52 arranged as a shift register series 53. Since the total number of valid outputs may vary due to the differing rates of storage and access, the bus 51 is connected to each register 52. An increment/decrement counter 54 is used to count the occurrences of FIFO buffer 44 writes and FIFO buffer 44 reads. Counter 54 has access to the pixel clock $C_P$ and a FIFO read signal $S_R$. The FIFO counter 54 output $S_C$ is applied to buffer output 55 and to the Register address decoder 56. The decoder uses the counter output $S_C$ and pixel clock $C_P$ in determining when to assert the appropriate register write signal on lines 57. The read signal $S_R$ is connected to the shift registers 52 to shift the registers by a number of registers depending on the read signal $S_R$ value. The same number of registers, from the end of the buffer, asserts data $D_I$ on the system data bus 15 during this operation.

There are basically three types of FIFO buffers, each of which may be used with the present invention. The first type of buffer 44 is the one shown in FIG. 5 where stored data is removed from buffer register series 53 from the first register 52 on the right hand end and data from the bus 51 is written into the last available shift register 52 from the left end of the buffer register series 53. A second type of buffer is one where the data is written into the first register on the left hand end of the buffer register series and data is taken out of the buffer register series from the first register with data in the series looking at it from the right end of the register series. The third type of buffer is one in which data from the data bus is written into the last available shift register looking from the left end of the buffer register series and data is taken out of the buffer register series from the first register with data in the series looking at it from the right end of the register series. In all three cases, data is removed from the buffer in the same sequence that it is entered into the buffer.

Referring again to FIG. 2, the interface 13 includes devices 45 to 49 to support the FIFO buffer 44. The devices include a Chip Command Decoder 45, FIFO Configuration Registers 46, FIFO Read Control 47, an Interrupt Generator 48 and Array Registers 49.

The CPU 10 accesses the registers 46 and 49 and FIFO buffer 44 through the Chip Command Decoder 45 by asserting the necessary read or write commands, along with the address on the system address and command bus 16. The command decoder 45 identifies any buffer or register being addressed and asserts the necessary read or write signal on the FIFO read control 47 line 56, the FIFO configuration register 46 command bus 57, or the array register 49 command bus 58. The signal on line 56 permits the FIFO read control 47 to generate a FIFO read signal $S_R$ in response to the output bus width signal $S_{Bw}$. Variation of the FIFO 44 output bus width register provides compatibility with a variety of system bus configurations such as 8-bit or 32-bit.

The FIFO configuration registers 46 include the FIFO output bus width, the FIFO limit value, the FIFO interrupt mask, and the FIFO interrupt register. All of these registers are connected to the system data bus 15 and are read/write capable, except the FIFO interrupt register, which is read only and determines its value from the interrupt generator as signal $S_I$. The reading and writing of these registers is controlled by the FIFO register command bus 57. The output of the FIFO configuration registers include FIFO limit signal $S_L$ from the FIFO limit register, the interrupt enable signal $S_E$ from the FIFO interrupt mask, and the output bus width signal $S_{BW}$ from the FIFO output bus width register.

The interrupt generator 48 compares the FIFO counter output $S_C$ and the FIFO limit $S_L$. If $S_C \geq S_L$ and if the interrupt enable signal $S_E$ is valid, the generator 48 asserts the interrupt signal $S_I$ to the CPU 10 via the interrupt bus 17. The use of an interrupt signal $S_I$ as an interrupt to the CPU 10 allows the processor to multi-task. It performs a buffer 44 unload operation when the interrupt is asserted, and carries out other programmed tasks at all other times.

Access to the array registers 49 is controlled by the array register command bus, 58. Data is exchanged with the system data bus 15. The content of the registers 49 defines the number of rows and columns to be employed in the imaging array 21. This information is communicated to the array address generator 22 by the row and column boundary signals $B_R$ and $B_C$.

The above interface 13 signals the CPU 10 through the interrupt signal $S_I$ when it has an amount of data approaching the limits of its storage capacity. The CPU then responds by having the data downloaded onto the system bus 15. It is important for the CPU to respond to the interface faster then the imaging array 21 can generate data. In addition, the size of the FIFO buffer 44 will also depend on the latency of the CPU 10, since during the period of time required by the CPU 10 to respond to the interrupt signal $S_I$, data is being stored in the buffer 44. The faster that the CPU 10 is able to respond to the interrupt and accept the downloaded data, the smaller the buffer 44 can be and the less space that it will require if integrated on the die with the imaging array 21. However, in real time control applications, it is important that the interface 13 and the CPU 10 be matched so that the data from all frames scanned by the imaging array 21 is properly and completely transferred to the CPU 10. This requirement may be relaxed somewhat for camera type applications where the necessity of capturing all frames is not required.

Figure 6:
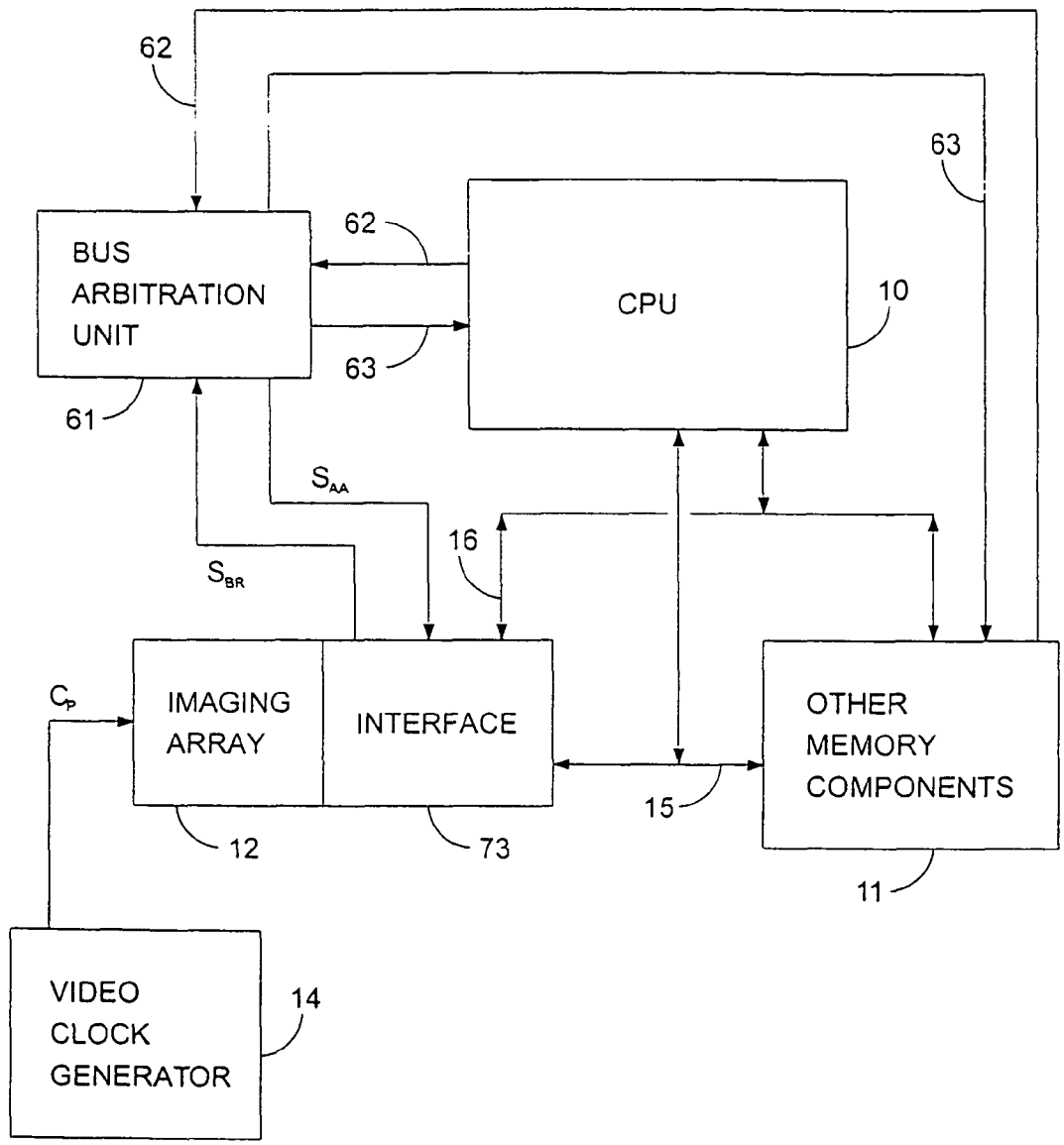
FIG. 6 is a block diagram of a computer system with bus arbitration utilizing the imaging array sensor.

In a further embodiment of the present invention as illustrated in FIG. 6, the interface 73 would interact with the CPU 10 and other system components through a bus arbitration unit 61. Rather then send an interrupt signal $S_I$ to the CPU 10, the interface 73 sends a bus request signal $S_{BR}$ to the bus arbitration unit 61 and receives an arbitration acknowledgement signal $S_{AA}$ when the bus 15 is available to it for downloading data. As illustrated in FIG. 6, the other units, CPU 10 and components 11 in the system have their own arbitration request lines 62 and arbitration acknowledgement lines 63. The Bus Arbitration Unit 61 receives all the requests for the bus 15 and selects one unit that is acknowledged as the current bus master.

Figure 7:
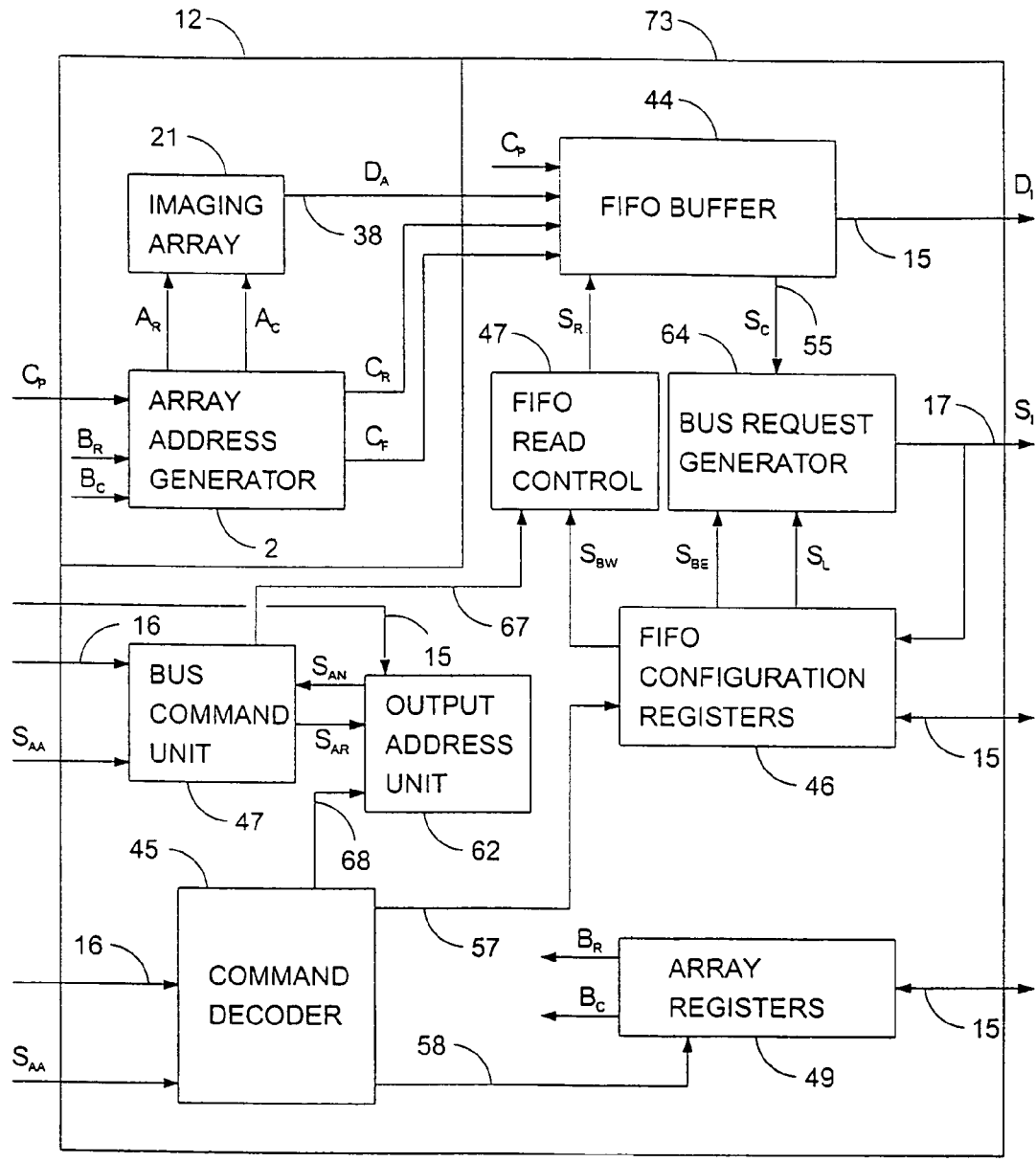
FIG. 7 is a block diagram of an imaging array sensor that includes an interface having bus arbitration circuitry.

The required components in the interface 73 that are required in order for it to be compatible with a bus arbitration system are shown in FIG. 7. A Bus Request Generator 64 functions in the same manner as the Interrupt Generator 48 shown in FIG. 2. A bus request signal $S_{BR}$ is generated in the same manner as the interrupt $S_I$. If $S_C \geq S_L$ and the bus request enable signal $S_{BE}$ is valid, the generator 64 asserts the bus request signal $S_{BR}$ to the bus arbitration unit 61.

An arbitration acknowledge signal $S_{AA}$ notifies the interface 73 that the interface 73 may assert command of the bus 15. The arbitration acknowledge signal $S_{AA}$ is applied to the chip command decoder 45 and a bus command unit 65. The arbitration acknowledge signal $S_{AA}$ deactivates the command decoder 45 for the duration that the interface controls the bus 15. On receiving the arbitration acknowledge signal $S_{AA}$, the bus command unit 65 will activate an output address unit 66 via the request output address signal $S_{AR}$ and receive from it the next address on the output address signal $S_{AN}$. This address is sent out onto the system address and control line 16. At the same time the bus command unit 65 asserts the necessary read or write signal on the FIFO read control 47 line 67.

The address may represent a location in the CPU 10, however, one advantage of this arrangement is that the address may be to a location in one of the system components 11 such as a memory so that the data may be stored in the system for processing by the CPU 10 without the CPU 10 being disturbed to make the transfer. The output address unit 66 contains a register and increment circuit for the purpose of recording and updating this address. The addresses in the output address unit 66 are transferred to the address registers through bus 15 under the control of a signal from CPU 10 on the system control and address bus 16 through command decoder 45.

As stated previously, the imaging array sensor 12 and the interface may be integrated onto one die. However, in addition, the Bus Arbitration Unit 61 may also be integrated onto the same die, and thus the bus arbitration request and acknowledge signals on lines 62 and 63 become external signals of the integrated unit.

Figure 8:
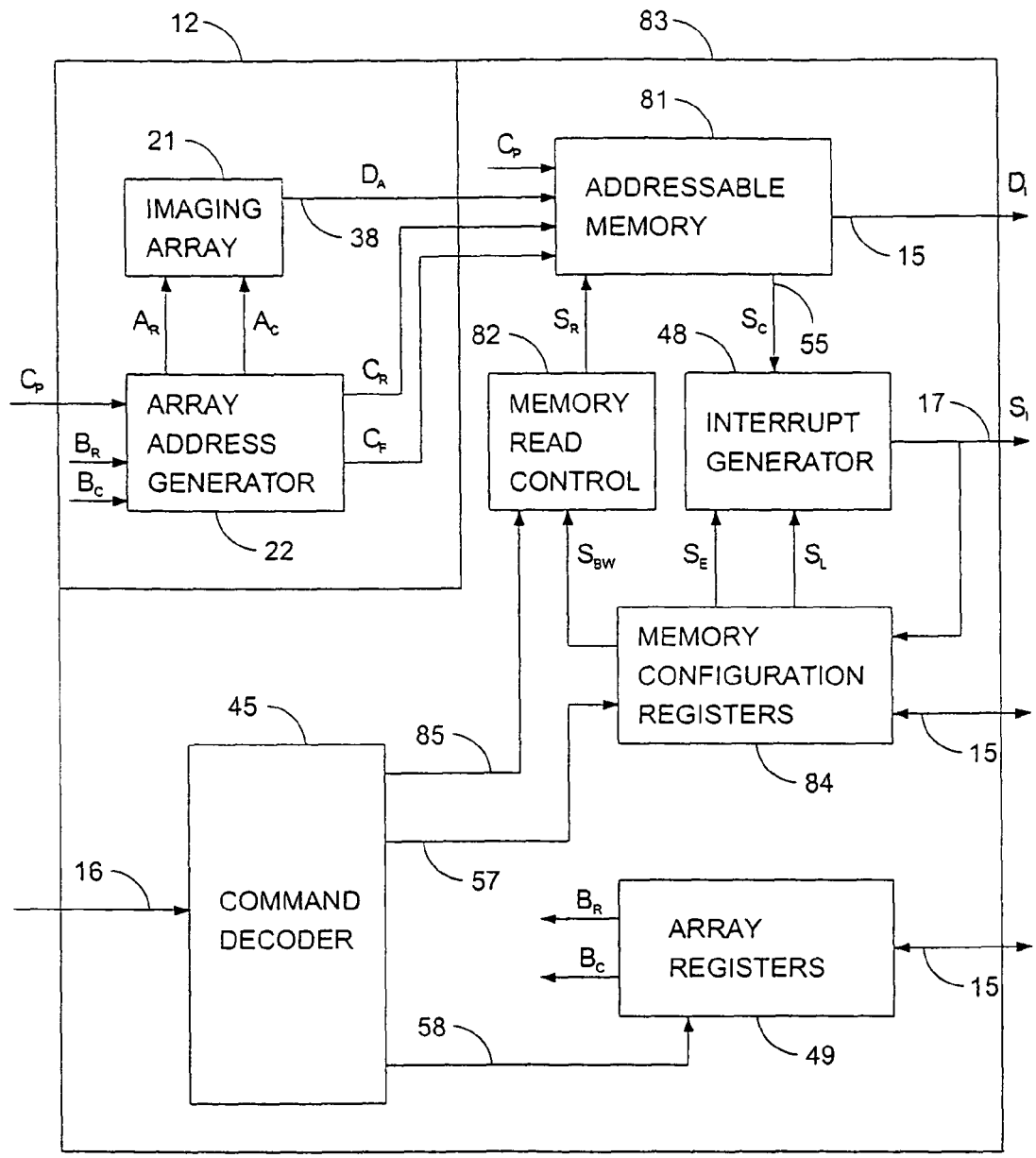
FIG. 8 is a block diagram of an imaging array sensor that includes an interface having an addressable memory.
Figure 7:
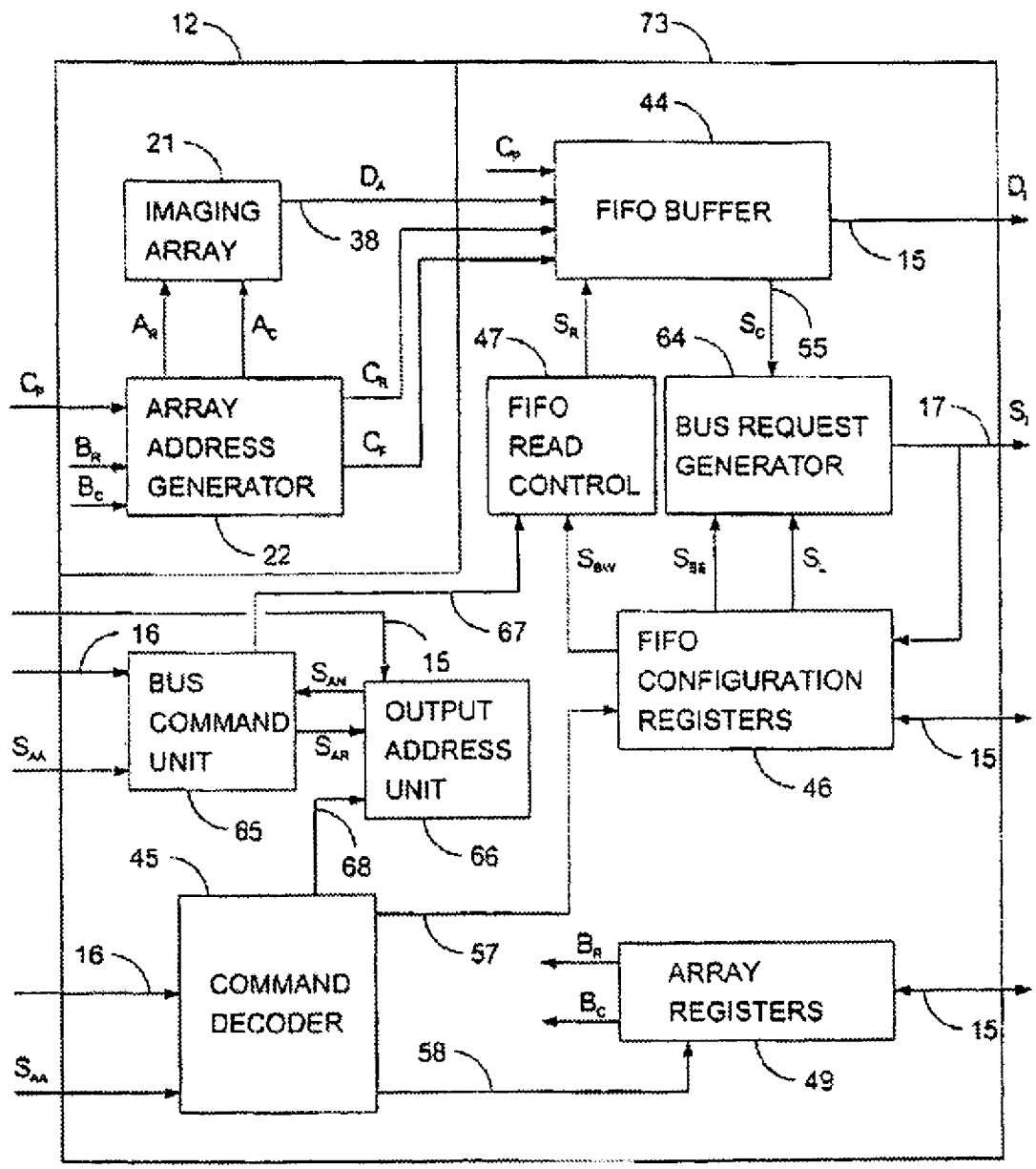

In a further embodiment of the present invention, the memory in the interface 83 may be an addressable memory 81 as shown on FIG. 8. For purposes of writing to memory 81 from the imaging array 21 the row and frame clocks $C_R$ and $C_F$ serve as row and column addresses. The video system clock $C_P$ serves as a write clock. Thus the memory 81 records the imaging array output $D_A$ at the same rate as the imaging array 21, and in the same array order as the imaging array 21.

For reading purposes, the read control signal $S_R$ provides the necessary address information, bus width information and read control timing. The memory read control 82 derives this information from the memory configuration registers 84 via the output bus width signal $S_{BW}$ and from the command decoder 45 via the read enable and read address bus 16 and through line 85. The memory configuration registers 84 are identical to the FIFO configuration registers 46. The memory 81 also includes an increment/decrement counter similar to counter 54 to interface with the interrupt generator 48. In addition, the interface 83 may be adapted for use with a bus arbitration unit 61 in the same manner that the interface 73 has been adapted as described in conjunction with FIG. 7.

Though the use of an addressable memory 81 in interface 83 does not provide the size, simplicity and lower cost of a FIFO memory, the fact that the memory is addressable allows the CPU to select parts or patterns from each frame for processing though the memory 81 would normally hold one frame which would be refreshed with each scan.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

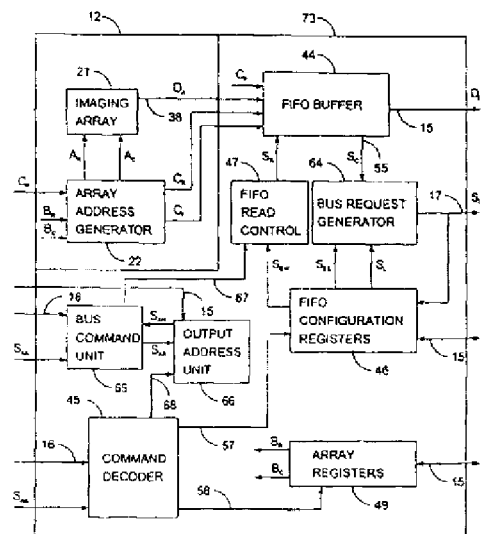

What is claimed is:

1. A method of processing imaging signals, the method comprising:
    receiving image data from an imaging array;
    storing the image data in a FIFO memory;
    updating a FIFO counter to maintain a count of the image data in the FIFO memory in response to memory reads and writes;
    comparing the count of the FIFO counter with a FIFO limit;
    generating an interrupt signal to request a processor to transfer image data from the FIFO memory in response to an interrupt enable signal being valid and the count of the FIFO counter having a predetermined relationship to the FIFO limit; and
    transferring image data from the FIFO memory to the processor in response to the interrupt signal.

2. The method of claim 1, further comprising:
    generating a FIFO limit signal, the interrupt enable signal, and an output bus width signal.

3. The method of claim 1, wherein said transferring image data comprises transferring image data from the FIFO memory to the processor in response to receiving a command from the processor.

4. The method of claim 1, further comprising:
    storing the image data in the FIFO memory at a first rate based on clocking signals associated with the image array; and
    transferring the image data from the FIFO memory at a second rate that is faster than the first rate.

5. The method of claim 1, further comprising:
    storing the image data in the FIFO memory at a first rate associated with the image array; and
    transferring the image data from the FIFO memory to the processor at a second rate associated with the processor.

6. The method of claim 1, further comprising:
    receiving clocking signals associated with the image data;
    storing the image data and the clocking signals in the FIFO memory at a first rate based on the clocking signals; and
    transferring the image data and the clocking signals from the FIFO memory to the processor at a second rate that is faster than the first rate.

7. The method of claim 6, wherein the clock signals comprise at least one video system clock signal, row clock signal, or frame clock signal.

8. A method of processing imaging signals, the method comprising:
    receiving image data from an imaging array;
    storing the image data in a FIFO memory;
    updating a FIFO counter to maintain a count of the image data in the FIFO memory in response to memory reads and writes;
    comparing the count of the FIFO counter with a FIFO limit;
    generating, in response to the count of the FIFO counter having a predetermined relationship to the FIFO limit, a bus request signal to request a bus arbitration unit to grant access to an output bus; and
    transferring image data from the FIFO memory to the output bus in response to receiving a grant signal from the bus arbitration unit.

9. The method of claim 8, further comprising:
    generating a FIFO limit signal and an output bus width signal.

10. The method of claim 8, further comprising:
    storing the image data in the FIFO memory at a first rate based on clocking signals associated with the image array; and
    transferring the image data from the FIFO memory at a second rate that is faster than the first rate.

11. The method of claim 8, further comprising:
    storing the image data in the FIFO memory at a first rate associated with the image array; and
    transferring the image data from the FIFO memory to a processing system at a second rate associated with the processing system.

12. The method of claim 8, further comprising:
    receiving clocking signals associated with the image data;
    storing the image data and the clocking signals in the FIFO memory at a first rate based on the clocking signals; and
    transferring the image data and the clocking signals from the FIFO memory to a processing system at a second rate that is faster than the first rate.

13. The method of claim 8, wherein the clock signals comprise at least one video system clock signal, row clock signal, or frame clock signal.

14. A method of processing imaging signals, the method comprising:
    receiving, from an imaging array, image data and clocking signals associated with the image data;
    storing the image data and the associated clocking signals in a memory at a rate based on the associated clocking signals, wherein the associated clocking signals comprise at least one video system clock signal, row clock signal, or frame clock signal;
    generating a request to transfer image data and associated clocking signals from the memory in response to a predetermined amount of data being stored in the memory; and
    transferring image data and associated clocking signals from the memory in response to the request.

15. The method of claim 14, wherein said generating a request comprises generating an interrupt signal that requests a processor to download image data and associated clocking signals from the memory.

16. The method of claim 14, wherein the memory is a FIFO memory.

17. The method of claim 16, further comprising:
    generating a FIFO limit signal, an interrupt enable signal, and an output bus width signal.

18. The method of claim 16, further comprising:
    updating a FIFO counter to maintain a count of data in the FIFO memory in response to FIFO memory reads and writes.

19. The method of claim 18, further comprising:
    comparing the count of the FIFO counter with a FIFO limit;
    sending an interrupt signal to a processor in response to an interrupt enable signal being valid and the count of the FIFO counter having a predetermined relationship to the FIFO limit; and
    transferring image data and associated clocking signals from the memory to the processor in response to receiving a command from the processor.

20. The method of claim 18, further comprising:
    comparing the count of the FIFO counter with a FIFO limit;
    sending a bus request signal to a bus arbitration unit in response to the count of the FIFO counter having a predetermined relationship to the FIFO limit; and
    transferring image data and associated clocking signals from the memory to an output bus in response to receiving a grant signal from the bus arbitration unit.

21. The method of claim 14, further comprising:
    transferring the image data and associated clocking signals from the memory at a second rate that is faster than the rate of said storing.

22. The method of claim 14, further comprising:
    transferring the image data and associated clocking signals from the memory to a processing system at a second rate associated with the processing system.

23. The method of claim 14, further comprising:
    transferring the image data and the associated clocking signals from the memory to a processing system at a second rate that is faster than the rate of said storing.

* * * * *

UNITED STATES PATENT AND TRADEMARK OFFICE
CERTIFICATE OF CORRECTION

| | |
|---|---|
| PATENT NO. | : 8,537,242 B2 |
| APPLICATION NO. | : 11/259791 |
| DATED | : September 17, 2013 |
| INVENTOR(S) | : Suska |

It is certified that error appears in the above-identified patent and that said Letters Patent is hereby corrected as shown below:

The title page showing the illustrative figure should be deleted to be replaced with the attached title page.

In the Drawings

Drawing sheet, consisting of Fig. 7, should be deleted to be replace with the drawing sheet, consisting of Fig. 7, as shown on the attached pages.

In the Specification

In Column 6, Line 15, delete "faster then" and insert -- faster than --, therefor.

In Column 6, Line 33, delete "Rather then" and inert -- Rather than --, therefor.

Signed and Sealed this
Third Day of June, 2014

Michelle K. Lee
*Deputy Director of the United States Patent and Trademark Office*

(12) United States Patent
Suska

(10) Patent No.: US 8,537,242 B2
(45) Date of Patent: *Sep. 17, 2013

(54) HOST INTERFACE FOR IMAGING ARRAYS

(75) Inventor: Mark Suska, Ottawa (CA)

(73) Assignee: Harusaki Technologies, LLC, Wilmington, DE (US)

(*) Notice: Subject to any disclaimer, the term of this patent is extended or adjusted under 35 U.S.C. 154(b) by 1584 days.

This patent is subject to a terminal disclaimer.

(21) Appl. No.: 11/259,791

(22) Filed: Oct. 27, 2005

(65) Prior Publication Data

US 2006/0044435 A1 Mar. 2, 2006

Related U.S. Application Data

(62) Division of application No. 09/742,723, filed on Dec. 21, 2000, now Pat. No. 6,972,790.

(60) Provisional application No. 60/177,496, filed on Jan. 21, 2000.

(51) Int. Cl.
*H04N 5/76* (2006.01)
*H04N 5/228* (2006.01)
*H04N 5/235* (2006.01)

(52) U.S. Cl.
USPC ............... 348/231.1; 348/222.1; 348/230.1

(58) Field of Classification Search
USPC ............. 348/241, 294, 302, 307, 308, 311, 348/207.1, 333.05, 222.1, 231.3, 231.99, 348/312, 317, 203, 246
See application file for complete search history.

(56) References Cited

U.S. PATENT DOCUMENTS 4,837,628 A 6/1989 Sasaki
5,581,280 A * 12/1996 Reinert et al. ............... 345/558

(Continued)

FOREIGN PATENT DOCUMENTS

EP 0 932 302 A2 7/1999
JP 63-294182 11/1988

(Continued)

OTHER PUBLICATIONS

Omnivision: "OV511 Advanced Camera to USB Bridge, Data Sheet Rev. 1.0", Jul. 17, 1998, Omnivision Technologies, XP002293773, p. 6-14, tables 9-11, figures 1-4, 6,10,12.

(Continued)

*Primary Examiner* — Trung Diep
(74) *Attorney, Agent, or Firm* — McAndrews, Held & Malloy, Ltd.

(57) ABSTRACT

An interface for receiving data from an image sensor having an imaging array and a clock generator and for transferring the data to a processor system is described. The interface comprises a memory for storing the imaging array data and the clocking signals at a rate determined by the clocking signals. In response to the quantity of data in the memory, a signal generator generates a signal for transmission to the processor system and a circuit controls the transfer of the data from the memory at a rate determined by the processor system. The memory may be a first-in first-out (FIFO) buffer or an addressable memory. The interface is preferably integrated on the same die as the image sensor. The signal generator may generate either an interrupt signal for transmission to the processor system or a bus request signal for transmission to a bus arbitration unit for the processor system.

23 Claims, 8 Drawing Sheets